Nov. 15, 1949  A. R. BROWN  2,488,168
PROTECTIVE EQUIPMENT
Filed Oct. 15, 1945
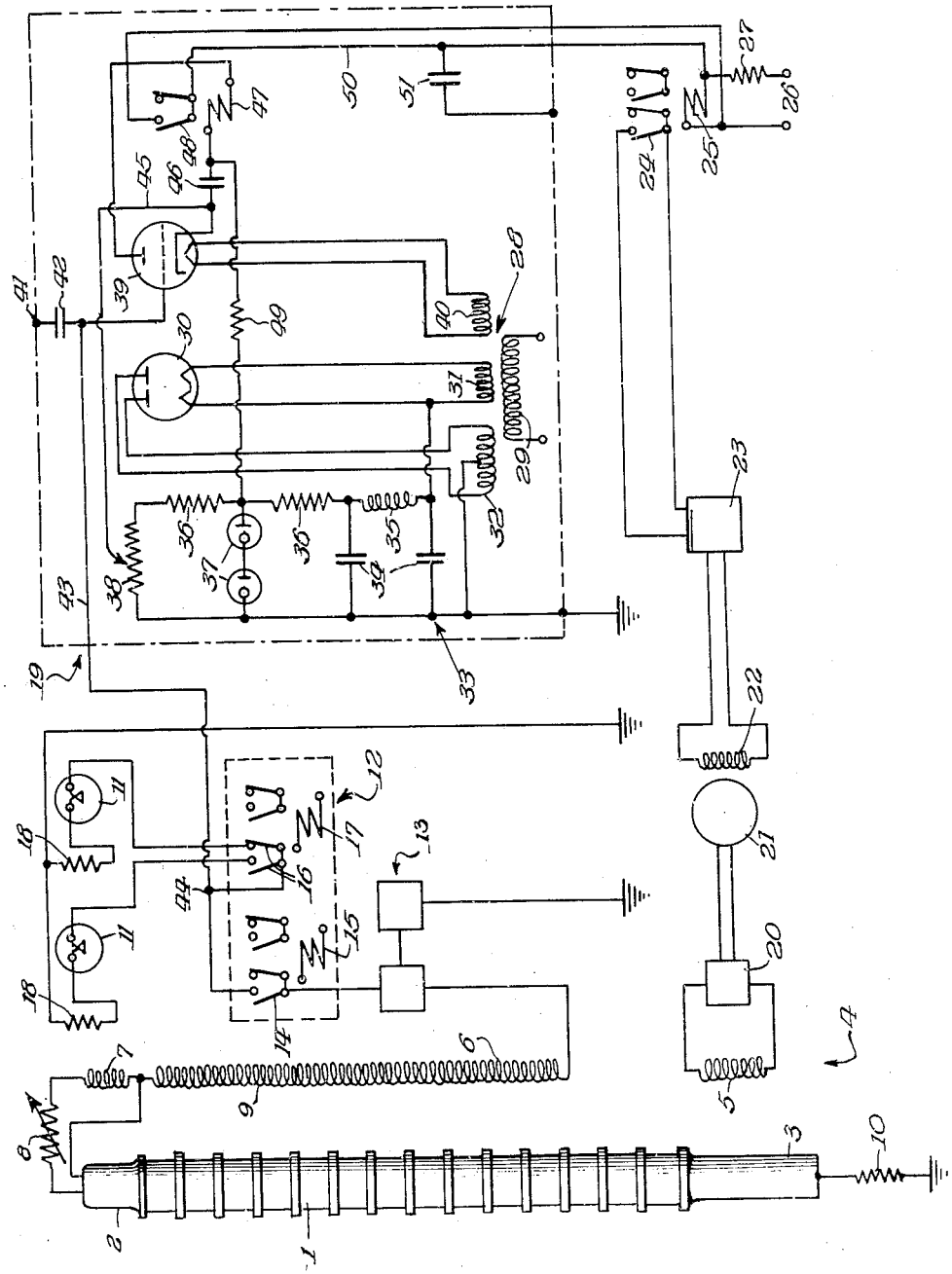
Inventor:
Allan R. Brown
By: Spencer, Marzall, Johnston & Cook
Attys Patented Nov. 15, 1949

2,488,168

UNITED STATES PATENT OFFICE 2,488,168

PROTECTIVE EQUIPMENT

Allan R. Brown, Elmhurst, Ill., assignor to General Electric X-Ray Corporation, Chicago, Ill., a corporation of New York Application October 15, 1945, Serial No. 622,458

3 Claims. (Cl. 250—103)

The present invention relates in general to electronics and has more particular reference to the operation and control of X-ray generators; the invention in its more specific aspects relating to means for controlling the operation of an X-ray generator in response to overcurrent conditions in the control system to thereby afford protection for sensitive equipment, such as microammeters and the like, required in the system.

An important object of the present invention is to provide control means for use, more particularly, in the operation of high voltage X-ray generators, and adapted to disable or render inoperative at least certain portions of the control system in response to excessive current flow; a further object being to provide sensitive means operable to protect sensitive equipment, such as microammeters and the like, connected in the system.

Another important object is to utilize a gaseous conduction device for controlling the operation of the system; a further object being to employ the gaseous conduction device under critical bias control for the purpose of disabling sensitive circuit portions when current flow therein becomes excessively high, and to restore such circuit portions as and when current conditions again become normal.

Another object is to utilize a gaseous conduction device, such as a gaseous triode, as trigger means for the actuation of an overload protection relay system; a further object being to utilize the trigger means to release relay actuating energy, stored in a condenser, while the trigger means is inactive, in order to actuate the protective relay system upon release of said trigger means.

Another important object is to provide means for protecting sensitive and easily damaged equipment, such as microammeters; a further object being to provide protection for such sensitive equipment used in connection with the operation of a high voltage X-ray generator.

The foregoing and numerous other important objects, advantages, and inherent functions of the invention will become apparent as the invention is more fully understood from the following description, which, taken in conjunction with the accompanying drawing, discloses a preferred embodiment of the invention.

Referring to the drawing, the single figure is a diagrammatic representation of a high voltage X-ray generator and associated control equipment embodying the present invention.

In developing and building high voltage X-ray generators, designed for operation at potentials of the order of one million volts, or more, it has been found desirable to employ sensitive metering equipment for indicating electrical characteristic and operating condition of the generator while the same is in operation. Such sensitive equipment may include one or more microammeters calibrated for the indication of current flow over various current indicating ranges. One meter, for example, may be calibrated to indicate current flow within the range from zero to twenty microamperes, while another may be calibrated for operation within a range from zero to say one hundred microamperes. Microammeters of the character mentioned, however, are exceedingly sensitive and susceptible of major damage if exposed to electrical overloading; and the present invention has for its more particular object the provision of positively operating means for protecting such sensitive indicating devices against injurious or destructive overloads.

The invention also embraces improved means for controlling the operation of high voltage X-ray equipment, and is not necessarily limited to meter protection.

To illustrate the invention the drawing shows an X-ray generator 1 having a cathode 2 and an anode 3, the generator being of the type designed for operation at high voltages of the order of one million volts, or more, between the anode and cathode. Power for energizing the generator is supplied through a transformer 4 having a primary winding 5 and a secondary winding 6. The secondary winding includes a portion 7 which is connected, through an adjustable current flow control device 8, with the cathode of the generator whereby to energize the cathode to render the same electron emissive. The secondary winding of the transformer, also, includes a winding portion 9, which is connectible between the cathode 2 and the anode 3. To this end, the anode 3 may be grounded, through a suitable resistor 10, while the low voltage end of the secondary winding 9 may be connected to ground, through one or other of the sensitive microammeters 11, by means of relay switches 12, in order to complete the anode-cathode circuit of the generator.

Specifically, the high voltage circuit extends from the cathode of the generator through the transformer winding 9 thence through a filter 13 adapted to by-pass the alternating current component directly to ground while delivering direct current component to a normally open switch 14. The switch 14 may, of course, be a normally closed switch adapted to be held open so long as its operating solenoid 15 is energized. As shown, however, the switch 14 is a normally open switch which is operatively associated with and closable by a solenoid 15 when energized. From the switch 14 the circuit extends to a pair of relay switches 16. The switches 16 are interlocked so that one is open when the other is closed, and vice-versa, one switch being normally open and the other normally closed, and both being operatively associated with a solenoid 17. One of the switches 16 is connected, through one of the meters 11 and preferably through a suitable ground connection and the resistor 18, to the anode 9 of the generator; and the other switch 16 is likewise connected, through the other meter 11, to the anode of the generator. Each meter preferably has a suitable resistor 18 associated therewith in series relationship.

When the solenoid 15 is energized, thus closing the switch 14, it will be seen that the anode-cathode circuit of the generator will be completed through one or other of the meters 11, depending upon whether or not the solenoid 17 is energized. In order to protect the apparatus, and particularly the meters 11, against destructive overload conditions that may prevail from time to time, the present invention contemplates an overload cut-out system 19 adapted to reduce the delivery of power in the anode-cathode circuit of the generator whenever overload conditions exist in said circuit.

Power is delivered to the primary winding 5 of the transformer 4, through suitable supply and control circuit means 20, from an alternating current generator 21. This alternator 21 has a field winding 22 energized through suitable circuits 23 under the control of a relay switch 24, operable by an associated actuating solenoid 25. The switch 24 may be a normally open switch and the solenoid 25 may be connected to a source of energizing power 26, through a suitable resistor 27, in order to maintain the switch 24 in closed position, thereby causing the alternator 21 to supply power to the primary transformer winding 5. In the event of an overload in the anode-cathode circuit of the generator, the cut-out system 19 may open the switch 24, as by short-circuiting the solenoid 25, to thereby reduce or cut off the power delivered by the alternator 21 into the anode-cathode circuit of the X-ray generator.

Alternately the protective system may be connected to open the switch 14 to disconnect the meter circuit, in the event of dangerous overload conditions; and the protective system, suitably connected, obviously may be utilized to accomplish any desired control function.

To this end, the protective system 19 may comprise a power supply transformer 28 having a primary winding 29 adapted to be energized from any suitable power source, a rectifier 30 preferably of the electron flow type having a cathode energized from a secondary winding 31 of the transformer 28, and a pair of anodes connected with a secondary winding 32 of said transformer, rectification being accomplished by means of a filtering and regulating circuit 33 connected between a preferably grounded center tap on the secondary winding 32 and the cathode of the rectifier 30. The circuit 33 embodies filter condensers 34, reactance 35, resistors 36, gas conduction devices 37 for voltage regulation, and a potentiometer or voltage divider 38 interconnected with the transformer and the rectifier 30 to provide direct current at the potentiometer.

The system 19 includes a gaseous conduction triggering device, which preferably comprises a gaseous triode 39 having a cathode filament energized in any suitable fashion, as from a secondary winding 40 of the transformer 28. The grid of the triode is preferably connected to ground, as at 41, through a condenser 42, and is also connected, as by means of a conductor 43, with the anode-cathode circuit of the X-ray generator, preferably at a connection point 44, in said circuit, between the filter 13 and the meter selector switches 16. The cathode of the triode is connected, as by means of a conductor 45, with the potentiometer. The anode-cathode circuit of the triode includes a condenser 46 and the operating solenoid 47 of a switch 48, which is preferably closed when the solenoid 47 is energized and open otherwise. The anode-cathode circuit of the triode also is preferably connected, as through a resistor 49, with the rectifying system 33. The switch 48 may be connected to control the switch 24. To this end, the switch 48 may be connected across the solenoid 25, as by means of the conductors 50, the circuit being preferably grounded on one side through a condenser 51.

Alternately, the switch 48 may be connected to control the switch 14.

When the system is in operation, the switch 48 is normally open, the grid of the triode 39 is biased to normally prevent operation of the triode so that the condenser 46 may be charged. If the current through the connected microammeter 11 exceeds a predetermined value, for which the grid bias of the triode 39 has been set, the overall grid bias will be reduced sufficiently to allow the triode to fire, that is to say, to become conductive. Under such circumstances, the condenser 46 discharges through the triode and the relay coil 47 causing the switch 48 to operate and thereby to affect the switch 24 in order to de-energize the field winding 22 of the alternator 21 at least sufficiently to reduce the operating power delivered by the transformer 4 in the anode-cathode circuit of the X-ray generator.

When the condenser 46 has become fully discharged, the solenoid 47, being de-energized, allows the switch 48 to return to its normal position thereby permitting restoration of the field excitation in the alternator 21. At the same time the grid of the triode 39 regains control of the triode and the condenser regains its charge by means of the resistor 49, which is in series with the power supply system 33.

The gas triode 39 thus is utilized to trigger the relay actuating impulse to the solenoid 47, which is operated by the plate current of the triode, the condenser 46 serving to supply the necessary energy for actuating the relay when released by the trigger action of the triode, the condenser 46 receiving its charge through the resistor 49 during the period when the triode is inactive. The condenser 42 between the grid of the triode and ground, that is to say, the negative end of the power supply, serves to prevent operation of the triode in response to pulsating current or transients, unless the current in the meter circuit exceeds the value which would cause full scale deflection of the meter, or other selected predetermined value of voltage current. The filter condenser 51 serves to prevent the feeding back of transients in the circuit, which might cause the same to operate erratically.

The switch 48, as shown, comprises a normally open switch which, when closed by the firing of the triode 39, serves to de-energize the solenoid 25 whereby to allow the cooperating switch 24 to open to thereby control the field of the alternator 21. The switch 48 conveniently may comprise one of a pair of interlocked switches, both operated by the solenoid 47, and one being normally closed while the other is normally open. As an alternate arrangement, therefore, the normally closed switch 48 could be connected in series with the solenoid 25, in which case the solenoid 25 would be normally energized through the normally closed switch 48 by the power source 26 but would become de-energized to allow the switch 24 to open, upon the opening of the normally closed switch 48 in response to triggering of the triode.

The control may also be accomplished by connecting one or other of the switches 48 in circuit with the operating solenoid of a contactor switch connected in the primary circuit of the transformer whereby, upon triggering of the triode, the switch 48 will control the solenoid of the contactor to open the primary circuit of the transformer, a normally open switch 48 being employed if the contactor is of the normally closed type; but if the contactor be of the normally open type, it may be controlled by employing a normally closed switch 48.

By thus controlling the power supply from the generator to the transformer 4, it will be seen that the control may be utilized either to entirely cut off the power supply; or the switch 24, or other means controlled by the switch 48, may be used, in conjunction with suitable control means, to reduce the power supplied to the X-ray generator whenever overload conditions are established in the power circuit of the generator 1.

The protective system may also be connected to employ the switch 48 for the control of the switch 14, if desired, in order to open the meter circuit only, in response to overload conditions, without affecting the power supplied by the alternator. Obviously the protective system 19 may be employed to accomplish any other desired control function as may be desired in response to overload conditions in the actuating circuit.

It is thought that the invention and its numerous attendant advantages will be fully understood from the foregoing description, and it is obvious that numerous changes may be made in the form, construction and arrangement of the several parts without departing from the spirit of scope of the invention, or sacrificing any of its attendant advantages, the form herein disclosed being a preferred embodiment for the purpose of illustrating the invention.

The invention is hereby claimed as follows:

1. In a control system for an X-ray generator having a cathode and a grounded anode, an alternator having a field winding, and circuit means for applying, between said anode and cathode, electrical energy delivered from said alternator, including a voltage step-up power transformer having a high voltage secondary winding connected with said cathode and forming a tube energizing circuit for said generator, and a primary winding connected with said alternator, the combination with said secondary winding, of filter means for separating the uni-directional and alternating components of current in said tube energizing circuit, means for grounding the alternating component, a pair of sensitive meters and selectively operable means for connecting the same alternately in circuit between said filter means and ground to measure the uni-directional component of current in said tube energizing circuit, and a protective system comprising a control relay connected to control the excitation of said field winding of the alternator, said relay having an operating coil, a condenser, a gaseous triode having an anode, a cathode and a control grid, said operating coil, condenser, and the anode and cathode of said triode being connected in series to form a relay operating circuit, means continuously operable to charge said condenser, means normally biasing said triode to cut-off, and means connecting the grid of said triode with said tube energizing circuit, whereby to trigger said triode and render the same conducting to apply the condenser charge to actuate said relay whenever the voltage applied on said meters exceeds a predetermined safe value.

2. In a control system for an X-ray generator having a cathode and a grounded anode, a source of alternating current power, and circuit means for applying, between said anode and cathode, electrical energy delivered from said source, including a voltage step-up power transformer having a high voltage secondary winding connected with said cathode and forming a tube energizing circuit for said generator, and a primary winding connected with said alternator, the combination with said secondary winding, of filter means for separating the uni-directional and alternating components of current in said tube energizing circuit, means for grounding the alternating component, sensitive metering means connected in circuit between said filter means and ground to measure the uni-directional component of current in said tube energizing circuit, and a protective system comprising a control relay connected to control the delivery of electrical energy from said source through said tube energizing circuit to said metering means, said relay having an operating coil, a condenser, a gaseous triode having an anode, a cathode and a control grid, said operating coil, condenser, and the anode and cathode of said triode being connected in series to form a relay operating circuit, means continuously operable to charge said condenser, means normally biasing said triode to cut-off, and means connecting the grid of said triode with said tube energizing circuit, whereby to trigger said triode and render the same conducting to apply the condenser charge to actuate said relay whenever the voltage applied on said meters exceeds a predetermined safe value.

3. In a control system for an X-ray generator having a cathode and an anode, and means forming a tube circuit with said anode and cathode for applying alternating current electrical energy, at high potential, between said anode and cathode, the combination with said tube circuit, of filter means for separating the uni-directional and alternating components of current in said tube circuit and for circulating said components in separate parallel connected A. C. and D. C. leg portions of said circuit, sensitive metering means and means for connecting the same in circuit in said D. C. leg portion to measure the uni-directional component of current in said tube energizing circuit, and a protective system comprising a control relay connected to control the flow of electrical energy through said metering means, said relay having an operating coil, a condenser, a gaseous triode having an anode, a cathode and a control grid, said operating coil, condenser, and the anode and cathode of said triode being connected in series to form a relay operating circuit, means continuously operable to charge said condenser, means normally biasing said triode to cut-off, and means connecting the grid of said triode with said D. C. leg portion, whereby to trigger said triode and render the same conducting to apply the condenser charge to actuate said relay whenever the voltage applied on said metering means in said D. C. leg exceeds a predetermined safe value.

ALLAN R. BROWN.

REFERENCES CITED

The following references are of record in the file of this patent:

UNITED STATES PATENTS

| Number | Name | Date |
|---|---|---|
| 527,066 | Lamme | Oct. 9, 1894 |
| 1,474,408 | Deardorff | Nov. 20, 1923 |
| 1,833,078 | Hofmann | Nov. 24, 1931 |
| 1,871,787 | Goldsborough | Aug. 16, 1932 |
| 1,872,560 | Breisky | Aug. 16, 1932 |
| 2,218,629 | Swart | Oct. 22, 1940 |
| 2,363,753 | Smith et al. | Nov. 28, 1944 |
| 2,368,798 | Ball | Feb. 6, 1945 |
| 2,429,819 | Jordan | Oct. 28, 1947 |

FOREIGN PATENTS

| Number | Country | Date |
|---|---|---|
| 56,246 | Norway | Mar. 2, 1936 |
| 399,839 | Germany | July 29, 1924 |